United States Patent
Wu et al.

(10) Patent No.: US 10,623,082 B2
(45) Date of Patent: Apr. 14, 2020

(54) JOINT FOUNTAIN CODE AND NETWORK CODING FOR MULTIPLE-SOURCE-MULTIPLE- DESTINATION WIRELESS COMMUNICATION

(71) Applicant: University of Florida Research Foundation, Incorporated, Gainesville, FL (US)

(72) Inventors: Dapeng Oliver Wu, Gainesville, FL (US); Kairan Sun, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 62 days.

(21) Appl. No.: 15/865,586

(22) Filed: Jan. 9, 2018

(65) Prior Publication Data

US 2018/0212671 A1    Jul. 26, 2018

Related U.S. Application Data

(60) Provisional application No. 62/446,561, filed on Jan. 16, 2017.

(51) Int. Cl.
*H04B 7/155* (2006.01)
*H04W 28/02* (2009.01)
(Continued)

(52) U.S. Cl.
CPC ......... *H04B 7/155* (2013.01); *H04B 7/15521* (2013.01); *H04L 1/0076* (2013.01);
(Continued)

(58) Field of Classification Search
CPC .. H04B 7/155; H04B 7/15521; H04B 7/0413; H04L 49/90
See application file for complete search history.

(56) References Cited

U.S. PATENT DOCUMENTS 6,147,980 A * 11/2000 Yee ............... H04B 7/18508
370/316
2008/0117904 A1 * 5/2008 Radha ............... H04L 1/0009
370/389

(Continued)

OTHER PUBLICATIONS

Ahmad et al., "Unequal error protection using fountain codes with applications to video communication," IEEE Transactions on Multimedia, Nov. 2010, pp. 1-10.

(Continued)

*Primary Examiner* — Mounir Moutaouakil
(74) *Attorney, Agent, or Firm* — Alston & Bird LLP (57) ABSTRACT

Network protocols and methods of transmitting data over wireless networks, including wireless mesh networks, are provided. A method of data transmission in wireless networks can include sending packets from one or more terminal nodes to one or more relay nodes, recoding the packets in the one or more relay nodes, and transmitting the recoded packets from the one or more relay nodes to the one or more terminal nodes. The relay nodes can linearly recombine the received packets before retransmission. The terminal nodes can utilize the linearly recombined terminal nodes to recover packets by solving a set of linear equations using their original packets.

18 Claims, 6 Drawing Sheets

(51) Int. Cl.
*H04L 12/707* (2013.01)
*H04L 1/00* (2006.01)
*H04B 7/0413* (2017.01)
*H04L 12/861* (2013.01)

(52) U.S. Cl.
CPC .......... *H04L 45/24* (2013.01); *H04W 28/021* (2013.01); *H04B 7/0413* (2013.01); *H04L 49/90* (2013.01); *H04L 2001/0097* (2013.01)

(56) References Cited

U.S. PATENT DOCUMENTS

| | | | |
|---|---|---|---|
| 2010/0278169 A1* | 11/2010 | Wang ................ | H04B 7/15521 370/345 |
| 2010/0296432 A1* | 11/2010 | Mehta ................ | H04B 7/15592 370/315 |
| 2011/0103402 A1* | 5/2011 | Achir ................ | H03M 13/1105 370/474 |
| 2013/0195106 A1* | 8/2013 | Calmon ............. | H04B 7/15521 370/389 |
| 2013/0235794 A1* | 9/2013 | Liu ........................ | H04W 4/06 370/328 |
| 2014/0281837 A1* | 9/2014 | Frigo ................... | H04L 1/0041 714/776 |
| 2015/0358118 A1* | 12/2015 | Krigslund ............. | H04W 40/02 370/254 |
| 2016/0182561 A1* | 6/2016 | Reynolds, II ....... | H04L 41/0686 726/1 |
| 2017/0127463 A1* | 5/2017 | Narasimha ............ | H04W 40/02 |
| 2017/0134497 A1* | 5/2017 | Harter .................... | H04L 67/12 |
| 2017/0279558 A1* | 9/2017 | Badr ..................... | H04L 1/0009 |
| 2017/0310382 A1* | 10/2017 | Darby, III .......... | H04B 7/18517 |
| 2018/0205491 A1* | 7/2018 | Yu ......................... | H04L 1/0041 |
| 2018/0331781 A1* | 11/2018 | Welin ................... | H04L 1/0009 |

OTHER PUBLICATIONS

Bogino et al., "Sliding-window digital fountain codes for streaming of multimedia contents," IEEE International Symposium on Circuits and Systems, May 2007, pp. 3467-3470.

Byers et al., "A digital fountain approach to asynchronous reliable multicast," IEEE Journal on Selected Areas in Communications, Oct. 2002, pp. 1528-1540, vol. 20, No. 8.

Cataldi et al., "Sliding-window raptor codes for efficient scalable wireless video broadcasting with unequal loss protection," IEEE Transactions on Image Processing, Mar. 2010, pp. 1-12.

Hofmann et al., "Analysis of UDP, TCP and voice performance in IEEE 802.11b multihop networks," 13th European Wireless Conference, Apr. 2007, pp. 1-5.

Huang et al., "Just FUN: a joint fountain coding and network coding approach to loss-tolerant information spreading," Proceedings of the 15th ACM International Symposium on Mobile ad hoc Networking and Computing, Aug. 2014, pp. 83-92.

Katti et al., "XORs in the air: practical wireless network coding," Proceedings of the 2006 Conference on Applications, Technologies, Architectures, and Protocols for Computer Communications, Sep. 2006, pp. 1-12.

Luby, "Lt codes," Proceedings of the 43rd Annual IEEE Symposium on Foundations of Computer Science, Nov. 2002, pp. 1-10.

Mitzenmacher, "Digital fountains: a survey and look forward," 2004 IEEE Information Theory Workshop, Oct. 2004, pp. 271-276.

Pishro-Nik et al., "Nonuniform error correction using low-density parity-check codes," IEEE Transactions on Information Theory, Jul. 2005, pp. 2702-2714, vol. 51, No. 7.

Rahnavard et al., "Rateless codes with unequal error protection property," IEEE Transactions on Information Theory, Apr. 2007, pp. 1521-1532, vol. 53, No. 4.

Sejdinovic et al., "Expanding window fountain codes for unequal error protection," IEEE Transactions on Communications, Sep. 2009, pp. 2510-2516, vol. 57, No. 9.

Shokrollahi, "Raptor codes," IEEE Transactions on Information Theory, Jun. 2006, pp. 2551-2567, vol. 52, No. 6.

Sun et al., "Delay-aware fountain codes for video streaming with optimal sampling strategy," Cornell University Library, May 2016, pp. 1-12, https://arxiv.org/abs/1605.03236.

Vukobratovic et al., "Scalable video multicast using expanding window fountain codes," IEEE Transactions on Multimedia, Oct. 2009, pp. 1094-1104, vol. 11, No. 6.

Wagner et al., "Streaming of scalable video from multiple servers using rateless codes," International Conference on Multimedia and Expo, Jul. 2006, pp. 1-4.

* cited by examiner

A's Decoding Coefficients:

$$\text{Known by A} \left\{ \begin{array}{c} \\ \text{Broadcasted by R} \left\{ \begin{array}{cccc} A & B & C & D \\ 1 & 0 & 0 & 0 \\ \alpha_1 & \beta_1 & \gamma_1 & \delta_1 \\ \alpha_2 & \beta_2 & \gamma_2 & \delta_2 \\ \alpha_3 & \beta_3 & \gamma_3 & \delta_3 \end{array} \right] \left[ \begin{array}{c} Y \\ P_A \\ P_1 \\ P_2 \\ P_3 \end{array} \right] \right.$$

B's Decoding Coefficients:

C's Decoding Coefficients:

D's Decoding Coefficients:

JOINT FOUNTAIN CODE AND NETWORK CODING FOR MULTIPLE-SOURCE-MULTIPLE-DESTINATION WIRELESS COMMUNICATION

CROSS-REFERENCE TO RELATED APPLICATION

The present application claims the benefit of U.S. Provisional Application Ser. No. 62/446,561, filed Jan. 16, 2017, which is hereby incorporated by reference in its entirety, including any figures, tables, or drawings.

BACKGROUND

In the big data era, the internet continues to play an increasingly significant role. Furthermore, the use of wireless means to transfer data has become more important. Large scale projects have even been considered to make the internet ubiquitous around the globe. The futuristic plans show a general trend that the backbone traffic of the internet may shift towards wireless mesh networks Current network protocols are not ready for a complete transition to wireless mesh networks because they are largely based on the infrastructure of wired networks and point-to-point transmission models. For example, in order to overcome data loss, Transmission Control Protocol (TCP) uses error detecting code to determine whether a packet is damaged during transmission, and uses automatic repeat request (ARQ) protocol to recover the damaged packets. Although TCP can recover the lost packets, its control mechanisms are designed for wired networks. In wireless networks, its disadvantages are obvious: the packets required by acknowledgments (ACK) and retransmissions take extra bandwidth, and it is not suitable for multiple-input and multiple-output (MIMO) applications.

BRIEF SUMMARY

Embodiments of the subject invention provide network protocols and methods of transmitting data over wireless networks, including wireless mesh networks. Embodiments of the present invention include wireless meshed network protocols designed to optimize throughput of all-to-all transmission scenarios. Inter-session RLNC coding on packets can be performed from different flows at intermediate relay nodes. The number of transmissions can be reduced by exploiting the broadcast nature of wireless channels, and reliability can be enhanced by allowing neighbors to overhear and store coded packets. Methods of embodiments of the present invention can improve coding efficiency by probing the received degree of freedom (dof) status through per-hop ACK, and maximize the information contained in each transmission of coded packets so that the dofs of all neighbors can benefit. Experimental analysis and simulations have shown that the techniques of embodiments of the subject invention can outperform other schemes under a wide range of conditions.

According to an embodiment of the present invention, a method of data transmission in wireless networks can include sending packets from one or more terminal nodes to one or more relay nodes, recoding the packets in the one or more relay nodes, and transmitting the recoded packets from the one or more relay nodes to the one or more terminal nodes. The relay nodes can linearly recombine the received packets (e.g., $P_1 = \alpha_1 P_A + \beta_1 P_B + \gamma_1 P_C$ and $P_2 = \alpha_2 P_A + \beta_2 P_B + \gamma_2 P_C$. The terminal nodes can utilize the linearly recombined terminal nodes to recover packets by solving a set of linear equations using their original packets.

The parameters of the linear equations can be randomly chosen integers and linearly independent. Inter-session linear network coding (RLNC) can be applied to maximize MIMO throughput and the method can utilize shared network channels. The terminal nodes can be both transmitters and receivers, and two or more of the terminal nodes may not communicate directly.

Each terminal node can receive content sent by other terminal nodes and packets can be forwarded by one or more relay nodes. Each node can overhear and store packets sent by neighboring nodes and each terminal node can receive all packets sent by other terminal nodes through the relay nodes. The packets can be of a fixed and uniform size and the relay nodes, the terminal nodes, or both can compute the rank (or degree of freedom, dof) of stored packets. Unneeded packets can be discarded after all packets are received. The relay nodes can continue to send additional randomly combined coded packets until all terminal nodes can decode the data.

Each multicast session can determine routes independently of other active sessions and each type of node can be identified in a global fashion. Relay nodes can randomly combine packets of different flows within a region, and broadcast mixed packets to improve the dof of all neighboring nodes. Furthermore, the relay nodes can randomly combine data within RLNC packets and keep coding coefficients of each flow untouched. Only partial decoding may be applied to recover linear combinations involving a single slow, and possibly contributions from other flows.

DETAILED DESCRIPTION

The explosive traffic demand over lossy wireless networks is constantly calling for innovations in wireless communication communities. The state-of-the-art answer to this challenge is joint FoUntain coding and Network coding (FUN), which combines the best features of fountain coding, intra-session network coding, and cross-next-hop network coding. However, its application is limited to full-duplex transmissions using a shared multi-hop route, so it is impractical for multiple-input and multiple-output (MIMO) transmissions in wireless mesh networks. To broaden the applications of FUN code, embodiments of the present invention (which can be referred to as MIMO FUN) can maximize the MIMO throughput by applying inter-session random linear network coding (RLNC) and making use of the shared nature of wireless channels. Embodiments of the present invention include a protocol achieving global throughput optimization by applying local coding schemes on terminal and relay nodes. As such, embodiments of the present invention are capable of achieving unprecedented high throughput over lossy channels.

Some key advantages that embodiments of the present invention can have include: (1) random linear coding can be used for MIMO transmission, instead of XOR operations as in the existing COPE protocol; (2) each transmitted packet can be coded in a manner that maximizes the ranks of packets received by all the terminals; and (3) each relay node can keep record of the coding coefficients of the packets correctly received by its neighboring nodes, so that it has knowledge of the ranks of the packets received by its neighboring nodes and can generate coded packets that maximize the ranks of packets received by its neighbors.

Figure 1:
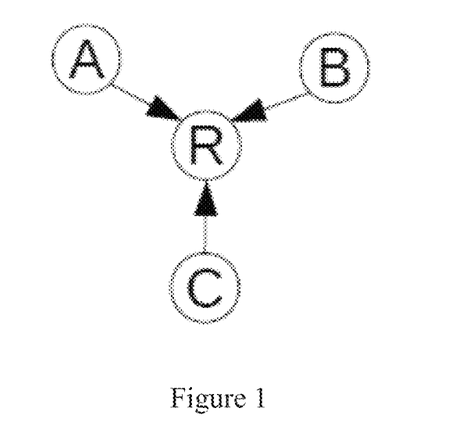
FIG. 1 shows an example of three-wheel topology.

Simplified examples will be used to explain the concepts of the present invention. FIG. 1 is an example showing four nodes in a network. Three terminals (A, B and C) are both transmitters and receivers, and each of the terminals may receive content sent by the other two terminals. However, because of the range of transmission, they cannot communicate to each other directly. As a result, in order to get the packets from the source, all the packets need to be forwarded by the relay node in the middle (R). There are six individual flows in total—one for each terminal-to-terminal pair. If each flow is treated as an independent uni-cast connection, the process will take twelve transmissions if there are no dropped packets. If a standard multicast routing protocol is used, such as Internet Group Management Protocol (IGMP), and the packets in R are forwarded in broadcast mode, there needs to be at least six transmissions—two for each packet to deliver from their source to their destination.

If the relay node recodes the received packets, there is the potential to reduce the number of transmissions. For example, if A, B and C first send their packet (denoted as $P_A$, $P_B$ and $P_C$ correspondingly) to relay node R, relay node R can broadcast two coded packets that linearly combine all the received packets (e.g., $P_1=\alpha_1 P_A+\beta_1 P_B+\gamma_1 P_C$ and $P_2=\alpha_2 P_A+\beta_2 P_B+\gamma_2 P_C$). For this example, it will be assumed that all the parameters are randomly chosen integers, and $P_1$ and $P_2$ are linearly independent. If all the terminals receive the two coded packets correctly, because they all have their original packets, each terminal can recover their other two original packets by solving linear equations. This process takes five transmissions, instead of twelve for uni-cast or six for ideal multicast. The saved transmissions can be used in sending new data, thus improving bandwidth.

As will be discussed, advantages of the present invention can become even more significant when packet loss is introduced. Because embodiments of the present invention allow each node to overhear and store packets sent by neighboring nodes, and a receiver can decode the original packets once enough coded packets are received, there is no need to retransmit any particular packets. Assuming lossy conditions in the previous example, relay nodes only need to keep sending new mixtures of stored packets until all of their receivers can decode the original packets.

The benefits are not limited to simple scenarios like the example above. To fully exploit the coding gains in more complex and generalized networks, an intelligent protocol needs to be designed and implemented. Embodiments of the present invention can operate based on the following assumptions: (1) There are two kinds of nodes in the network, terminal nodes and relay nodes. All terminals are both senders are receivers. Each terminal node needs to receive all the packets sent by all other terminal nodes through relay nodes. This can be referred to as the all-to-all assumption. The terms NT and NR can refer to the number of terminals and relay nodes, respectively. (2) The topology and routing information of the whole network can be known by all nodes. The routes can be generated beforehand using standard routing algorithms (e.g., B.A.T.M.A.N). (3) Each terminal can have a fixed amount of data to send. The size of each packet can be the same as well, and each source can be assumed to have k packets to send. (4) All of the nodes can store packets and have the ability to compute the rank (or degree of freedom, dof) of stored packets. Each of the nodes can also receive the rank and coefficients of packets buffered by neighboring nodes.

It should be pointed out that, with the all-to-all assumption, multicasts can be achieved with arbitrarily selected destinations by discarding unwanted packets after everything has been received. Because each terminal can receive all the packets sent by other terminals, and the number of terminals can be fixed during the transmission, the data received from different sources can be compiled into a bigger chunk of data. If each terminal node is given a terminal ID from 1 to $N_T$, which is in agreement across the nodes, each terminal can have a same block of data to receive, and the number of packets in the integrated data is $N_T \times k$.

When the data from each source is joined, the problem can be viewed differently. That is, if each terminal node contains partial data, how can the partial data be spread and aggregated with the help of relay nodes using the least number of transmissions. It will be assumed that the number of packets sent by each terminal is k=1 in the remaining examples. This assumption will be made because the focus will be on inter-session RLNC scheme design, and k=1 can simplify the analysis. As will be seen, the cases of k>1 can be easily derived from the k=1 case, because RLNC can also be applied on intra-session packets. Moreover, even if the scheme is using k=1 and there are multiple packets to send from the sources, only one packet needs to be sent at a time and the techniques of embodiments of the present invention can be applied multiple times.

Two examples will be provided in order to illustrate the techniques of embodiments of the present invention. The terminal nodes are denoted alphabetically as A, B, C, etc. Correspondingly, the original packets sent by the terminal nodes are denoted as $P_A$, $P_B$, $P_C$, etc. If each packet is a row vector, the integrated data that every terminal should receive is $P_{integ}=[P_A, P_B, P_C, \ldots]^T$, where $[\bullet]^T$ means the transpose operation, so there are $N_T$ rows of packets. When the original packets are recoded at relay nodes, the coded packets are denoted as $P_i=\alpha_i P_A+\beta_i P_B+\gamma_i P_C+\ldots$, which is the linear combination of the original packets. In the following topologies, what is overheard outside the direct communication links will be considered.

Figure 2A:
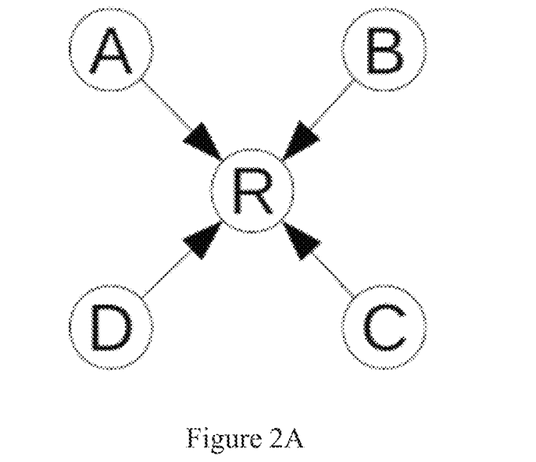
FIG. 2A shows an example of four-wheel topology.

This first example will use a four-wheel network topology as shown in FIG. 2A. There are five nodes in the network, four terminal nodes and a relay node in the middle. Each node can receive content broadcasted by the other three. The communication may only happen between nodes with links, and terminals cannot directly communicate. As a result, all the packets need to be forwarded by the relay node, which can recode the received packets.

A method of coding according to embodiments of the present invention can go as follows. All terminals can send the packets to R. If there are packet losses, the terminal should retransmit the lost original packet. After all the packets are delivered, R should have 4 packets in its buffer: $[P_A, P_B, P_C, P_D]^T$. R can then examine the terminals' dof. Considering the packets are already known by each user, sending 3 linearly independent combinations of the 4 buffered packets should be adequate for each node to decode all the other packets. If all the packets are correctly delivered, sending more than 3 coded packets will not help its neighbors to increase rank. As a result, R broadcasts 3 coded packets: $P_1=\alpha_1 P_A+\beta_1 P_B+\gamma_1 P_C+\delta_1 P_D$, $P_2=\alpha_2 P_A+\beta_2 P_B+\gamma_2 P_C+\delta_2 P_D$ and $P_3=\alpha_3 P_A+\beta_3 P_B+\gamma_3 P_C+\delta_3 P_D$. If the terminals do not receive enough coded packets to decode all the data, R should continue to send more randomly combined coded packets, e.g. $P_4$, $P_5$, etc., until all the terminals can decode all the data. It should be noted that if a terminal has a full dof, it does not need to continue to overhear and store newly received packets because it does not increase the dof of the stored packets.

Figure 2B:
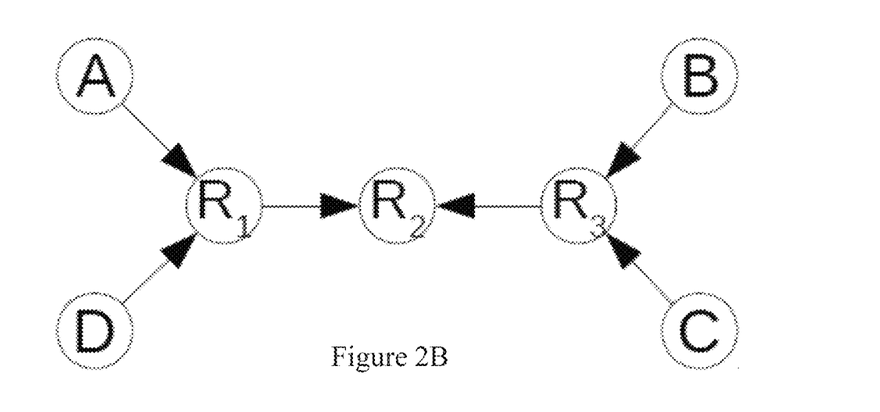
FIG. 2B shows an example of dumbbell topology.
Figure 3:
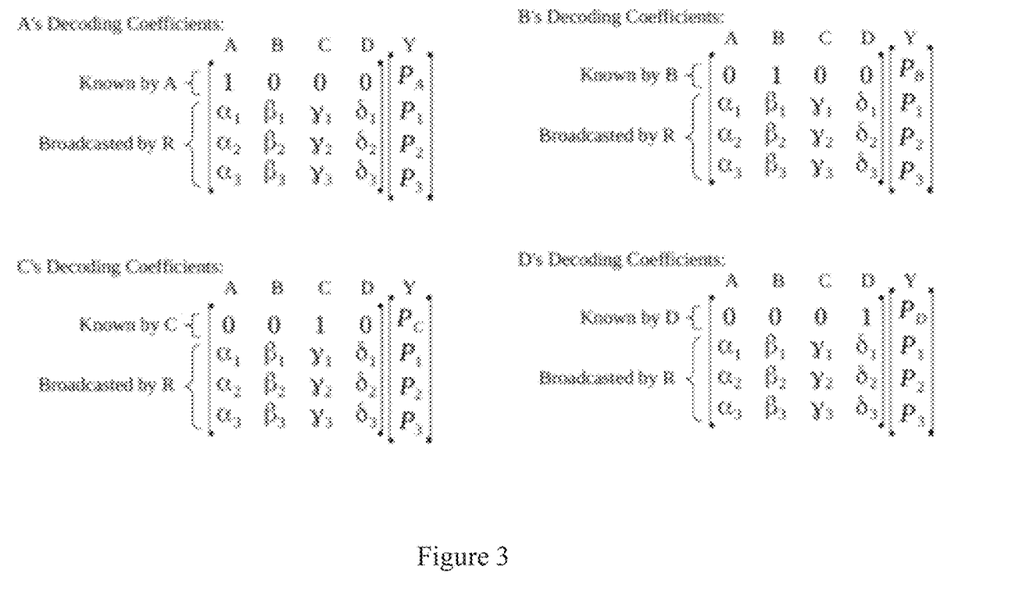
FIG. 3 shows decoding coefficients with full degrees of freedom.

If there is no packet loss, the coefficients received by each terminal is shown as in FIG. 3, and all the terminals now have sufficient dof to decode all the data. If some packets are lost and the other coded packets are received, the coefficients in the session of "broadcasted by R" will be different. In this second example of dumbbell topology, there are still four terminals, but there are three relay nodes in the middle: $R_1$, $R_2$ and $R_3$. The communication only happens between nodes with intervening links, as shown in FIG. 2B.

A method of coding according to an embodiment of the present invention can go as follows. Similar to the first step in four-wheel topology, all the terminals can send packets to its nearest relay nodes, and retransmit if packets are lost. Therefore, $R_1$ has 2 packets in the buffer: [$P_A$, $P_D$], and $R_3$ has 2 packets in the buffer: [$P_B$, $P_C$]. $R_2$ may have nothing buffered initially. The relay nodes can examine the dof of terminals on each next hop. Focusing on $R_1$ first, it is directly connected to A and B, but C and D are only reachable through $R_2$. By detecting the buffered dof of neighbors, the random mixtures of buffered packets $P_A$ and $P_D$ can be found to improve the ranks of node A and D by 1, and improve the rank of $R_2$ by 2. As a result, sending two coded packets would be inefficient for node A and D, and only one coded packet can be sent initially. The condition of $R_3$ can be similar, and only broadcasted.

$R_2$ can also overhear the coded packets broadcasted by $R_1$ and $R_3$. For $R_2$, the mixture of $P_1$ and $P_2$ will increase the ranks for all terminals. Without loss of generality, the coded packets can be broadcast, and $R_1$ and $R_3$ can receive $P_3$. With newly received $P_3$, both $R_1$ and $R_3$ can increase the ranks for all terminals by broadcasting the mixture of all buffered packets. For $R_1$, without loss of generality, the coded packet can be linearly independent. Also, $R_3$ can broadcast the coded packet.

$R_2$ can overhear the coded packets broadcast by $R_1$ and $R_3$. Notice that $R_2$ now has the full dof of all packets, so it can generate the coded arbitrary mixture of A, B, C and D. $R_2$ can then broadcast a mixture of all packets and $R_1$ and $R_3$ can receive $P_3$. Notice that all the relay nodes now have the full dof of all packets. $R_1$ and $R_3$ can send the linearly independent coded packets that increase the rank of all users. Finally, the ranks of all the terminals can be filled and all the terminals have sufficient dof to decode all the packets.

Embodiments of the present intention can exhibit ad-hoc route selection and each multicast session can determines its route(s) independently of other active sessions. Classical multicast routing techniques may be used.

Embodiments of the present invention can implement global optimization and identify each type of node in a global fashion. The relay node can randomly combine packets of different flows within a region, and broadcast forward the mixed packets to improve the dof of all neighboring nodes.

Embodiments of the present invention can exploit the structure of RLNC to improve XOR type schemes. Although the use of RLNC packets provides additional resiliency to packet losses across the network in general, these RLNC packets can also improve performance in inter-session coding regions, which typically depend on packet overhearing to be successful, and are thus susceptible to losses. In addition to overhearing transmissions corresponding to other flows, the nodes can store transmissions in order to expedite the recovery process of each generation of packets. To leverage the RLNC structure, the relay can randomly combine only the data within the RLNC packets, and keep the coding coefficients of each flow untouched. This feature is one aspect that can separate embodiments of the present invention from approaches that use RLNC and XOR coding.

In embodiments of the present invention, a relay can perform RLNC recoding and local feedback. The relay node can randomly combine newly received RLNC packets of each flow. If no new packets of one or more flows are available, the relay can generate a new RLNC packet by linearly combining the packets in its queue corresponding to that flow (e.g., recoding on a per flow basis). The resulting packet can then be mixed with packets of other flows. Furthermore, the nodes transmitting to the relay can be signaled by the relay when the relay has received all degrees of freedom, i.e., when it has enough coded packets to recover the original data. Although the relay does not have to decode, signaling to the node upstream allows that node to stop transmissions for that generation of packets.

Embodiments of present invention can allow for partial decoding in relay nodes. Since RLNC packets of different flows can be mixed, this implies that some level of decoding, or a cancellation of the effect of one flow over the other, is needed. However, only partial decoding is needed, if any, to recover linear combinations involving a single flow that had contributions from another flow.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method of data transmission in wireless networks (or a network protocol, or wireless mesh protocol), the method comprising:
sending packets from one or more terminal nodes to one or more relay nodes;
recoding the packets in the one or more relay nodes; and
transmitting the recoded packets from the one or more relay nodes to the one or more terminal nodes.

Embodiment 2

The method of Embodiment 1, wherein one or more of the relay nodes linearly recombines the received packets (e.g., $P_1=\alpha_1 P_A+\beta_1 P_B+\gamma_1 P_C$ and $P_2=\alpha_2 P_A+\beta_2 P_B+\gamma_2 P_C$).

Embodiment 3

The method of any of Embodiments 1-2, wherein one or more of the terminal nodes recovers packets by solving linear equations (e.g., by using their original packets).

Embodiment 4

The method of any of Embodiments 1-3, wherein the parameters of the linear equations are randomly chosen integers.

Embodiment 5

The method of any of Embodiments 1-4, wherein the linear equations are linearly independent.

Embodiment 6

The method of any of Embodiments 1-5, wherein inter-session linear network coding (RLNC) is applied to maximize MIMO throughput.

Embodiment 7

The method of any of Embodiments 1-6, wherein the method utilizes shared network channels.

Embodiment 8

The method of any of Embodiments 1-7, wherein one, several, or all of the terminal nodes are both transmitters and receivers.

Embodiment 9

The method of any of Embodiments 1-8, wherein two or more of the terminal nodes cannot communicate directly with each other.

Embodiment 10

The method of any of Embodiments 1-9, wherein each terminal node receives content sent by other terminal nodes.

Embodiment 11

The method of any of Embodiments 1-10, wherein packets are forwarded by one or more relay nodes.

Embodiment 12

The method of any of Embodiments 1-11, wherein each node overhears and stores packets sent by neighboring nodes.

Embodiment 13

The method of any of Embodiments 1-12, wherein each terminal node receives all packets sent by other terminal nodes (through the relay nodes).

Embodiment 14

The method of any of Embodiments 1-13, wherein the terminal nodes, the relay nodes, or both the relay nodes and the terminal nodes store packets (that are overheard, sent from other nodes, etc.).

Embodiment 15

The method of any of Embodiments 1-14, wherein the packets are of a fixed and uniform size.

Embodiment 16

The method of any of Embodiments 1-15, wherein the relay nodes, the terminal nodes, or both compute the rank (or degree of freedom, dof) of stored packets.

Embodiment 17

The method of any of Embodiments 1-16, wherein the relay nodes, the terminal nodes, or both store the rank and coefficients of packets buffered by neighboring nodes.

Embodiment 18

The method of any of Embodiments 1-17, wherein unneeded packets are discarded after all packets are received.

Embodiment 19

The method of any of Embodiments 1-18, wherein the relay nodes continues to send additional randomly combined coded packets until all terminal nodes can decode the data.

Embodiment 20

The method of any of Embodiments 1-19, wherein each multicast session determines its route(s) independently of other active sessions.

Embodiment 21

The method of any of Embodiments 1-20, wherein each type of node is identified in a global fashion, the relay node randomly combines packets of different flows within a region, and broadcasts mixed packets to improve the dof of all neighboring nodes.

Embodiment 22

The method of any of Embodiments 1-21, wherein relay nodes randomly combine data within RLNC packets and keep coding coefficients of each flow untouched (in their original state).

Embodiment 23

The method of any of Embodiments 1-22, wherein only partial decoding is applied to recover linear combinations involving a single slow (and possibly contributions from other flows).

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 4:
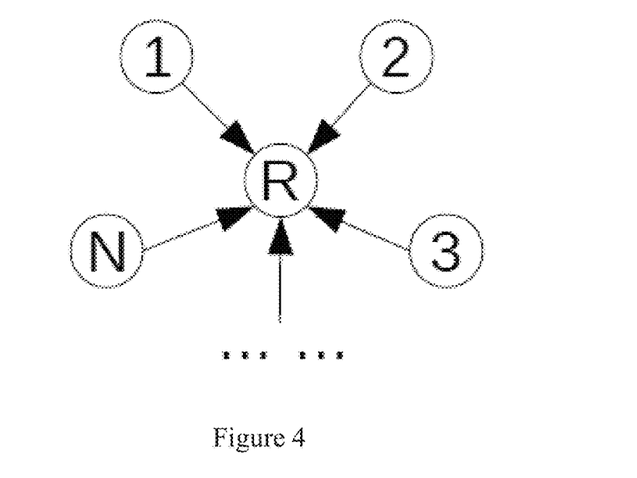
FIG. 4 shows an example of a generic wheel topology.
Figure 5A:
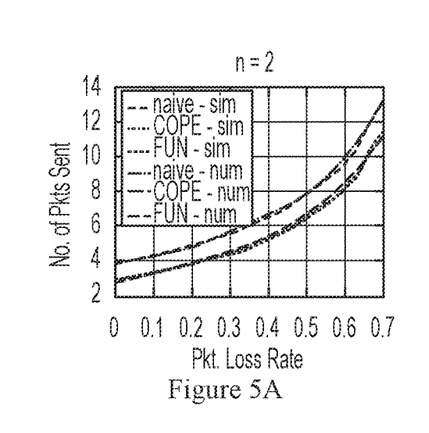
FIGS. 5A-E show theoretical and experimental test results of embodiments of the present invention.
Figure 5B:
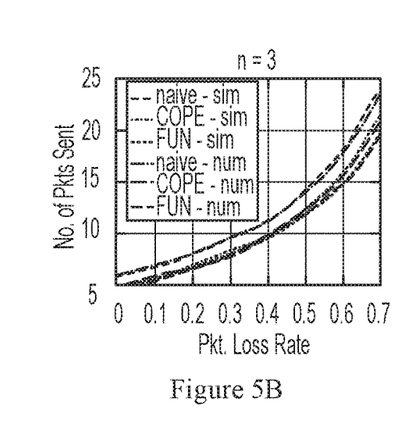
Figure 5C:
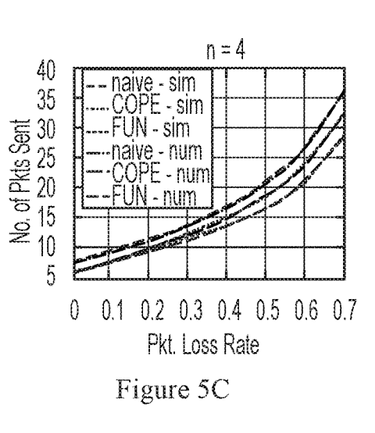
Figure 5D:
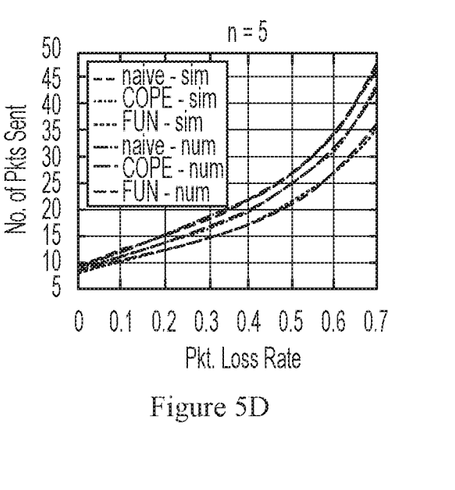
Figure 5E:
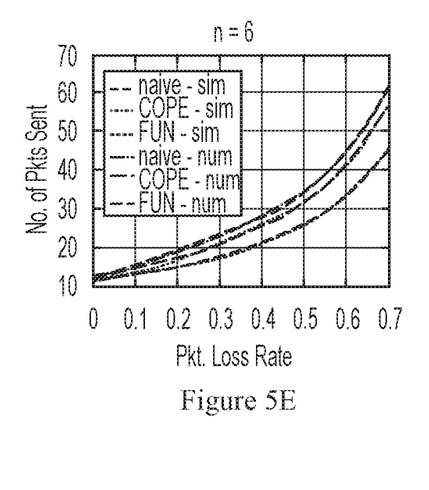

A comparison of schemes and numerical analysis was conducted to prove the concepts of the present invention. A mathematical expectation of the number of packets needed to be sent in different schemes was computed and methods of the present invention were simulated in a TDMA network for performance evaluation. The wheel topology was the focus of the analysis. That is, one relay node in the middle surrounded by n terminals, as shown in FIG. 4.

To simplify the analysis, the loss rate between relay node and all the terminals is assumed to be the same ($p_e$) and bidirectional, and overhearing between nodes is ignored. An embodiment of the present invention will be compared to the existing schemes: Naive broadcast scheme (with ACK and retransmission); COPE-like algorithm Katti et al. (2006); and CORE Ahrenholz (2010).

Naïve Broadcast Scheme with ACK and Retransmission relies on MAC layer retransmissions to deliver data packets. There are two phases. In the first phase, terminals send their packet to relay node. In order to guarantee delivery, a node will retransmit its packet if the relay node does not receive it. Second, the relay node in the middle directly broadcasts packets it receives to all the terminals. However, to ensure delivery, the relay node will retransmit the packet until each of the terminals receives it at least once.

The mathematical expectation of packets needed to send is the weighted summation of the probabilities: $E[X] = \sum_{i=1}^{\infty} i \times pr_i$, where i denotes the number of packets needed to send, and $pr_i$ denotes the probability of successful delivery using exactly i packets (called ith delivery in the rest of this article).

In the first phase, for each terminal, the probability of ith delivery is $$pr_i = (1 - p_e)p_e^{i-1} \tag{1-1}$$

So, $$E = \sum_{n=1}^{\infty} i(1 - p_e)p_e^{i-1} = \frac{1}{1 - p_e} \tag{1-2}$$

Using the inclusion-exclusion principle, the probability of "ith delivery when there are n receivers and each receiver must receive the packet at least once" is:

$$pr_i^{(n)} = \sum_{k=1}^{n}(-1)^{k-1}\binom{n}{k}[(1-p_e)p_e^{i-1}]^k(1-p_e^i)^{n-k} \tag{1-3}$$

We can observe that $pr_i^{(1)} = pr_i$.

As a result, the probability of ith delivery in the second phase is $pr_i^{(n-1)}$, since each packet only needs to be received by n−1 terminals (except for the owner of that packet). Since both terminals and the relay node need to deliver n packets, respectively, the total expectation is $$E[X] = n\sum_{n=1}^{\infty} i \times pr_i^{(1)} + n\sum_{n=1}^{\infty} i \times pr_i^{(n-1)} \tag{1-4}$$

In the COPE-like Algorithm analysis, it will be assumed that the MAC protocol will retransmit data packets in the links from terminals to R and will retransmit XORed packets from R until receivers acknowledge reception. Terminal # j, j≠i must overhear the transmissions from R in order to capture an XORed packet, as in Hundebøll et al. (2012). This assumption is made to maintain compatibility with commercial systems because MAC layers in wireless networks, e.g., WiFi, provide Automatic Repeat reQuest (ARQ) mechanisms for unicast transmissions, but not for broadcast transmissions. Incoming packets to the relay are stored in a queue for the corresponding flow.

The COPE-like Algorithm scheme also has two phases. The first phase is the same as Naïve Broadcast Scheme with ACK and Retransmission. In the second phase, the relay node will broadcast the XOR combination of the packets from two sources, namely $P_1 \oplus P_2, P_2 \oplus P_3, \ldots, P_{n-1} \oplus P_n$. The delivery confirmation is performed in a per-packet manner.

Since there are n−1 XORed packets needed to broadcast, the total expectation of packets using the COPE-like algorithm is $$E[X] = n\sum_{i=1}^{\infty} i \times pr_i^{(1)} + (n-1)\sum_{n=1}^{\infty} i \times pr_i^{(n)} \tag{1-5}$$

The simplest scheme is the CORE scheme. The relay performs intersession coding every time a coding opportunity is detected, i.e., new RLNC packets are received from each source. In the absence of coding opportunities, the relay falls back to forwarding received RLNC packets. Sources send RLNC packets to the destinations with no recoding at the relay. Packets are transmitted using unicast sessions, as in COPE-like schemes, allowing retransmissions. When transmitting from the relay, the destination with the highest loss probability is chosen as the receiver, and the other destination is forced to overhear. If link quality is the same, the destination is chosen uniformly at random.

Embodiments of the present invention can have two phases. The first phase can be the same or similar to the previous schemes. In the second phase, a relay node can broadcast the linear combinations of the packets from all sources. The ith coded packet is denoted as $Ci = \alpha_{i,1} P_1 + \alpha_{i,2} P_2 + \ldots + \alpha_{i,n} P_n$. Different from the COPE-like scheme, the terminals do not have to confirm the coded packets one by one. Instead, each terminal can send an acknowledgement to the relay node once it collects enough DoF to decode all the packets. When all the terminals acknowledge they have enough DoF, the relay node can stop broadcasting.

The probability of "ith delivery when there are n receivers, and each receiver needs to receive at least 1 coded packets" is $$pr_i^{(n,l)} = \sum_{k=1}^{n} (-1)^{k-1} \binom{n}{k} \left[ \binom{i-1}{l-1} (1-p_e)^l p_e^{i-1} \right]^k \quad (1\text{-}6)$$

It can be observed that $pr_i^{(n,l)} = pr_i^{(n)}$.

As a result, the probability of ith delivery in the second phase is $pr_i^{(n,n-1)}$, since each source needs to receive at least n−1 different coded packets to decode all the other packets. So, the total expectation is $$E[X] = n \sum_{i=1}^{\infty} i \times pr_i^{(1)} + \sum_{n=1}^{\infty} i \times pr_i^{(n,n-1)} \quad (1\text{-}7)$$

A simulation of the wheel topology was performed using MATLAB and the network was chosen to be TDMA. The range of n was [2, 6] and the range of packet loss rate was [0.0, 0.7]. Simulations were not conducted for when n>6, because the overhearing effect would be significant if the terminals were too dense, hence lowering the fidelity of the simulation.

FIGS. 5A-E show theoretical and experimental test results of embodiments of the present invention. The solid lines are simulated results, and the broken lines are theoretical results. As can be seen in FIGS. 5A-E, the theoretical results fit with the simulated results very well. Furthermore, sending less packets means higher performance. As a result, in general, embodiments of the present invention can perform better than the COPE-like algorithm, and the COPE-like algorithm outperforms naive broadcasting. When n=2, the performance of COPE-like algorithm and the embodiments of the present were very similar, but as n increased the performance difference also increased.

Embodiments of the present invention can benefit from and utilize per-hop delivery confirmation. However, unlike COPE-like schemes, the terminals do not have to confirm the coded packets one by one. Instead, each terminal can send an acknowledgement to the relay node once it collects enough DoF to decode all the packets. When all the terminals acknowledge they have enough DoF, the relay node stops broadcasting.

Embodiments of the present invention can utilize a three-tier design, and all nodes in the network can be classified into three tiers: terminals (Tier 3), edge routers (Tier 2), and backbone routers (Tier 1). Terminals are the nodes that are generating and consuming native packets, and it is assumed that all terminals are both senders and receivers. The task is limited to each terminal node sending its message to all the other terminals. Edge routers are the relay nodes directly connected to the terminals and the other nodes are backbone routers. For example, there are three tiers in the dumbbell topology in FIG. 2B, where A, B, C, D are terminal nodes, R1 and R3 are edge routers, and R2 is a backbone router. The packets are transmitted tier by tier: first, the terminal node(s) send(s) its/their native (or inner coded) packets to edge routers. Then, edge routers mix the inner coded packets using inter-flow outer codes and forwards the coded packets to the backbone. In backbone routers, all the packets are inter-flow coded packets.

An ACK mechanism can be utilized in embodiments of the present invention to ensure the delivery of packets between each hop. Each terminal node can buffer all the coefficients of linearly independent packets that are received. Once the dof is adequate, the packets from all sources can be decoded.

Each relay node can keep track of routing information (e.g., the next hop to reach each destination), linearly independent packets that are received/overheard, and each terminal's currently buffered coefficients and rank. Because there is only one packet to transmit for each source, each terminal only needs to send packets to the corresponding relay node. Once a packet is received, the node stores it in the buffer and checks the coefficients' rank. If the rank is full, the node decodes the original packets.

Figure 6:
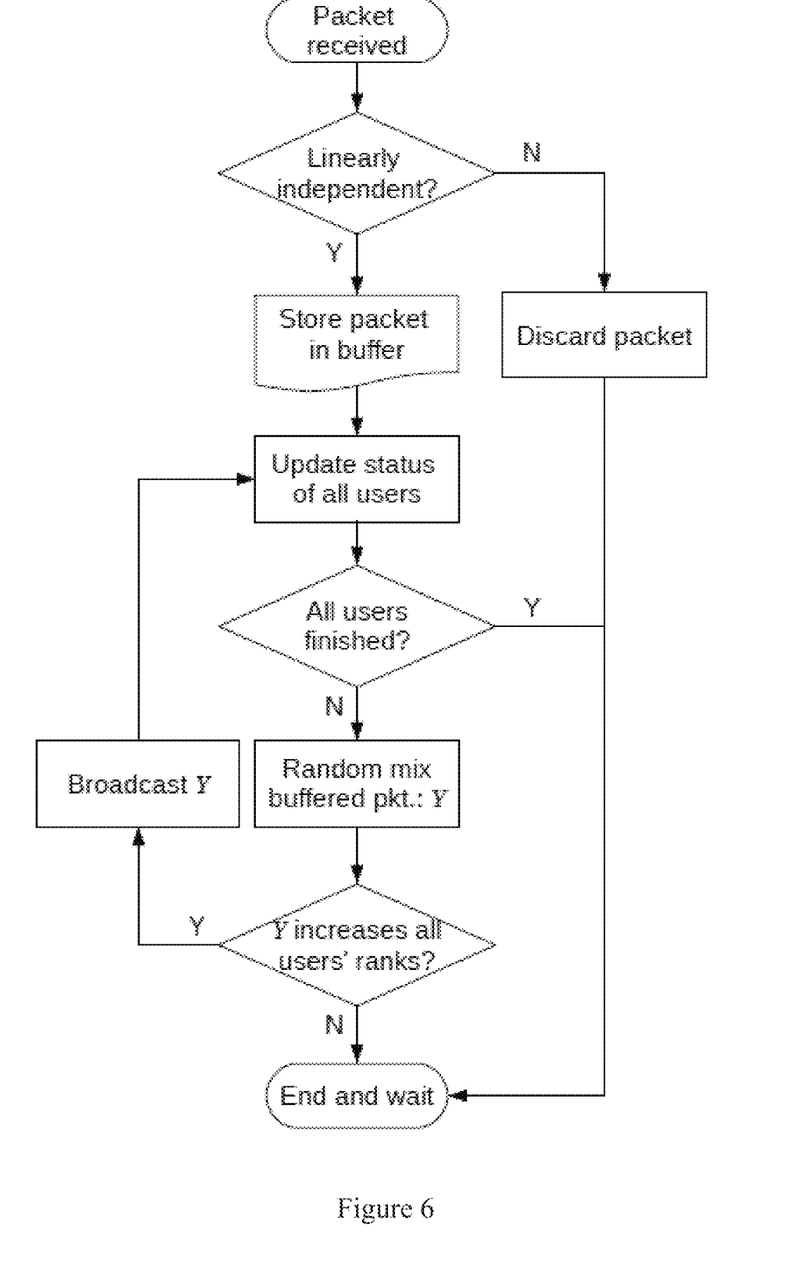
FIG. 6 shows a flowchart of a method according to an embodiment of the present invention.

The algorithm for receiving and recoding packets for relay nodes is more complicated. An algorithm flow chart according to an embodiment of the present invention is shown in FIG. 6. A relay node can buffer all the packets it receives, including both original and coded packets. The relay node can then discard packets that are correlated to buffered packets and check the coefficient status of all the users that route through it. If all of the users already have adequate dofs, the relay node can stop sending packets. All of the packets in the buffer can then be randomly mixed and a coded packet Y can be produced. Finally, it can be determined whether Y can make a contribution to increasing the ranks of some or all of the unfinished users. If Y cannot make a contribution to increasing the ranks of some or all of the unfinished users, the packet sending can stop and wait. If Y can make a contribution to increasing the ranks of some or all of the unfinished users, coded packet Y can be rebroadcasted and the method can go back to the step of updating the status of all users.

TABLE I

Finite State Machine (FSM) for terminal nodes

| Current | Action | Event | Next State |
| --- | --- | --- | --- |
| S0 | Clear the buffer. | New data arrives. | S1 |
|  | See if upper layer has more data to send. | No more data. | End |
| S1 | Wait for poll of edge router. | Polled by edge router. | S2 |
| S2 | Send RTS to edge router and wait for CTS. | CTS not received within T1 seconds. Random backup and, | S2 |
|  |  | CTS received. | S3 |
| S3 | Send the data message, and wait for ACK. | ACK not received within T2 seconds. Random backup and, | S3 |
|  |  | ACK received. | S4 |
| S4 | Receive a packet from | Packet received. | S5 |
|  |  | ACK query received. | S4 |

TABLE I-continued

Finite State Machine (FSM) for terminal nodes

| Current | Action | Event | Next State |
|---|---|---|---|
|  | edge router, and wait for ACK query. | Reply ACK/NACK and, |  |
| S5 | Check rank of received packets. | Rank is full. | S0 |
|  |  | Rank is not full. | S4 |

Figure 7:
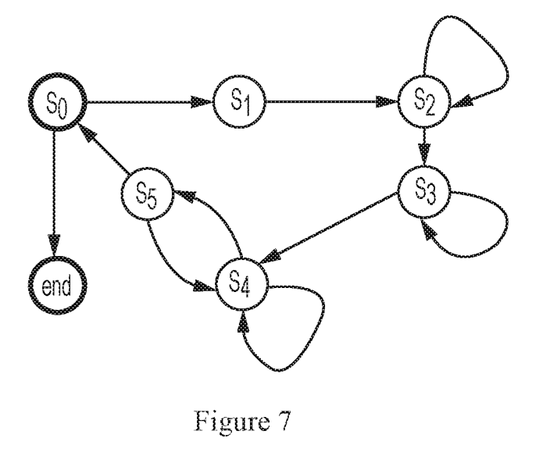
FIG. 7 shows a finite state machine (FSM) for terminal nodes.
Figure 8:
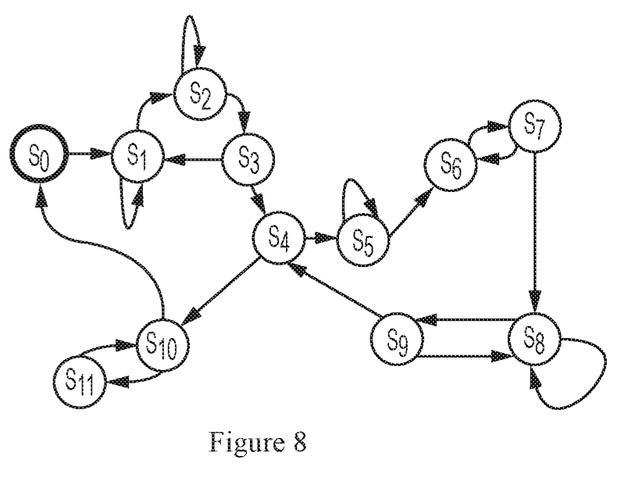
FIG. 8 shows an FSM for edge routers.
Figure 9:
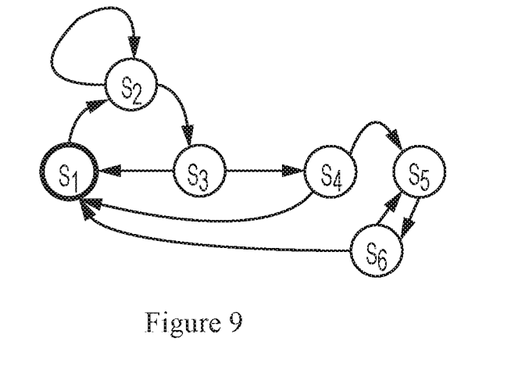
FIG. 9 shows an FSM for backbone routers.

The Finite State Machine (FSM) of terminal nodes is shown in FIG. 7 and Table I. The FSM of edge routers is shown in FIG. 8 and Table II. The FSM of backbone routers is shown in FIG. 9 and Table III.

CORE and EMANE were used as the emulators to produce the experimental results. Specification 802.11b was used in a MAC and PHY layer with CTS/RTS enabled. The transmission rate (of header and payload) was set to 1 Mbit/s. In all the scenarios, all terminals were both senders are receivers and the task was for each terminal to send its message to all the other terminals.

Three topologies were used in the experimental investigation. The wheel topology is one relay node surrounded by n terminals, as in FIG. 2A. Two variants of the wheel topology were tested, the three-wheel topology and the four-wheel topology.

The second type of topology tested was the dumbbell topology. The dumbbell topology contains three tiers: terminals A, B, C and D; edge routers R1 and R3; and backbone router R2.

TABLE II

FSM for edge routers

| Current | Action | Event | Next State |
|---|---|---|---|
| S0 | Clear the buffer. | Buffer cleared. | S1 |
| S1 | Poll next terminal, and wait for RTS. | RTS not received within T3 seconds. Random backup and, | S1 |
|  |  | RTS received. | S2 |
| S2 | Send CTS and wait for packet. | RTS received. | S2 |
|  |  | Packet received. | S3 |
| S3 | Check if all its terminals send their packets. | All terminals done. | S4 |
|  |  | Not all terminals done. | S1 |
| S4 | Check rank of received packets. | Rank is full. | S10 |
|  |  | Rank is not full. | S5 |
| S5 | Send RTS to neighbors and wait for CTS from backbone router. | CTS not received within T4 seconds. Random backup and, | S5 |
|  |  | CTS received. | S6 |
| S6 | Broadcast a coded packet, and query every neighbor for ACK. | ACK received from all neighbors by polling. | S7 |
| S7 | Check if another coded packet can increase the rank of all its neighbors. | Yes, another coded packet will contribute all neighbors' DoF. | S6 |
|  |  | No, another coded packet will not contribute all neighbors' DoF. | S8 |
| S8 | Receive packets from backbone router, and wait for ACK query. | Packet received. | S9 |
|  |  | ACK query received. | S8 |
|  |  | Reply ACK/NACK and, |  |
| S9 | Check if all packets from backbone router received. | All packets from backbone router received. | S4 |
|  |  | Not all received. | S9 |
| S10 | Check the rank of the terminals. | All terminals have full rank. | S0 |

TABLE II-continued

FSM for edge routers

| Current | Action | Event | Next State |
|---|---|---|---|
|  |  | Not all terminals have full rank. | S11 |
| S11 | Broadcast a coded packet, and query every terminal for ACK. | ACK received from all terminals by polling. | S10 |

A uniform distance of 22 m was established between each node of the figures. A transmission range was set to 25 m so that stations can communicate only with their two adjacent neighbors. The carrier sense range was set to 50 m, i.e., nodes can sense two-hop neighbors. The routing table was manually input into each node before starting the experiments.

A method according to an embodiment of the present invention was executed at each node simultaneously using a timer. The amount of time was calculated based on the difference between the time when first packet was sent by any node to when all nodes received all the packets. Each experiment was run 10 times, and the average number was recorded as the duration.

TABLE III

FSM for backbone routers

| Current | Action | Event | Next |
|---|---|---|---|
| S1 | Wait for RTS from edge routers. | RTS received. | S2 |
| S2 | Send CTS and wait for packets. | Packets received. | S3 |
|  |  | RTS received. | S2 |
| S3 | Wait for ACK query. | ACK query received. | S4 |
| S4 | Check if packets from all edge routers received. | All packets received. | S5 |
|  |  | Not all packets received. | S1 |
| S5 | Broadcast RTS and a coded packets | ACK received from all neighbors by polling. | S6 |
| S6 | Check if another coded packet can increase the rank of all its neighbors. | Yes, another coded packet will contribute all neighbors' DoF. | S5 |
|  |  | No, another coded packet will not contribute all neighbors' DoF. | S1 |

TABLE IV

Performance comparison between different topologies using MIMO FUN.

| Topology | No. of flows | Payload size (Byte) | Max hops | Avg. duration (s) | Throughput (Kbit/s) |
|---|---|---|---|---|---|
| Wheel-3 | 6 | 1024 | 2 | 0.0696 | 689.47 |
| Wheel-4 | 12 | 1024 | 2 | 0.158 | 607.82 |
| Dumbbell | 12 | 1024 | 4 | 0.268 | 358.22 |

The resulting throughput considered 3 factors: payload size (m, in Byte), number of end-to-end to-end flows (k) and duration time (t). So, $$\text{Throughput} = \frac{8 \times m \times k}{t}.$$

An embodiment of the present invention was comparted to unicast TCP. The topology and 802.11b set-up were the same. The packet size was set to 1024 Bytes. Each end-to-end flow was transmitted individually and, in order to get a stable throughput result, 1 MB data was sent in each flow, and the first 1 KB was discarded.

A TCP scheme was implemented and tested in two ways. First, each flow was tested separately, and the average throughput was calculated. That result was equivalent to each terminal node transmitting sequentially. Second, each scenario was tested with each terminal node transmitting at the same time, which led to heavier channel contention. The final results are shown below.

TABLE V

Performance comparison between different schemes.

| Topology | Scheme | Throughput (Kbit/s) |
|---|---|---|
| Wheel-3 | MIMO FUN | 689.47 |
|  | TCP | 382.33 |
|  | TCP w/contention | 311.4 |
| Wheel-4 | MIMO FUN | 607.82 |
|  | TCP | 382.33 |
|  | TCP w/contention | 281.76 |
| Dumbbell | MIMO FUN | 358.22 |
|  | TCP | 192.12 |
|  | TCP w/contention | 102.87 |

The resulting throughput of TCP fits the conclusion of Hofmann et al. (2007).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Ahmad, Shakeel, Hamzaoui, Raouf, and Al-Akaidi, Marwan M. "Unequal error protection using fountain codes with applications to video communication." *IEEE Transactions on Multimedia* 13 (2011). 1: 92-101.

Ahrenholz, Jeff. "Comparison of core network emulation platforms." *MILITARY COMMUNICATIONS CONFERENCE, 2010-MILCOM 2010*. IEEE, 2010, 166-171.

Bogino, Mattia C O, Cataldi, Pasquale, Grangetto, Marco, Magli, Enrico, and Olmo, Gabriella. "Sliding-window digital fountain codes for streaming of multimedia contents." *IEEE International Symposium on Circuits and Systems, 2007. ISCAS 2007*. IEEE, 2007, 3467-3470.

Byers, John W, Luby, Michael, and Mitzenmacher, Michael. "A digital fountain approach to asynchronous reliable multicast." *IEEE Journal on Selected Areas in Communications* 20 (2002). 8: 1528-1540.

Cataldi, Pasquale, Grangetto, Marco, Tillo, Tammam, Magli, Enrico, and Olmo, Gabriella. "Sliding-window raptor codes for efficient scalable wireless video broadcasting with unequal loss protection." *IEEE Transactions on Image Processing* 19 (2010). 6: 1491-1503.

Hofmann, Philipp, An, Chunlei, Loyola, Luis, and Aad, Imad. "Analysis of UDP, TCP and voice performance in IEEE 802.11 b multihop networks." *13th European Wireless Conference*. 2007, 1-4.

Huang, Qiuyuan, Sun, Kairan, Li, Xin, and Wu, Dapeng Oliver. "Just FUN: A joint fountain coding and network coding approach to loss-tolerant information spreading." *Proceedings of the 15th ACM international symposium on Mobile ad hoc networking and computing*. ACM, 2014, 83-92.

Hundebøll, Martin, Ledet-Pedersen, Jeppe, Heide, Janus, Pedersen, Morten V, Rein, Stephan A, and Fitzek, Frank H P. "Catwoman: Implementation and performance evaluation of IEEE 802.11 based multi-hop networks using network coding." *Vehicular Technology Conference (VTC Fall), 2012 IEEE*. IEEE, 2012, 1-5.

Katti, Sachin, Rahul, Hariharan, Hu, Wenjun, Katabi, Dina, M'edard, Muriel, and Crowcroft, Jon. "XORs in the air: practical wireless network coding." *ACM SIGCOMM computer communication review*. vol. 36. ACM, 2006, 243-254.

Luby, Michael. "LT codes." *2013 IEEE 54th Annual Symposium on Foundations of Computer Science*. IEEE Computer Society, 2002, 271-271.

Masnick, Burt and Wolf, Jack. "On linear unequal error protection codes." *IEEE Transactions on Information Theory* 13 (1967). 4: 600-607.

Mitzenmacher, Michael. "Digital fountains: A survey and look forward." *Information Theory Workshop, 2004. IEEE*. IEEE, 2004, 271-276.

Neumann, Axel, Aichele, Corinna, Lindner, Marek, and Wunderlich, Simon. "Better approach to mobile ad-hoc networking (BATMAN)." *IETF draft, October* (2008).

Perkins, Colin. *RTP: Audio and Video for the Internet*. Addison-Wesley Professional, 2003.

Pishro-Nik, Hossein, Rahnavard, Nazanin, and Fekri, Faramarz. "Nonuniform error correction using low-density parity-check codes." *IEEE Transactions on Information Theory* 51 (2005). 7: 2702-2714.

Rahnavard, Nazanin and Fekri, Faramarz. "Unequal error protection using low-density parity-check codes." *Information Theory, 2004. ISIT 2004. Proceedings. International Symposium on*. IEEE, 2004, 449.

Rahnavard, Nazanin, Vellambi, Badri N, and Fekri, Faramarz. "Rateless codes with unequal error protection property." *IEEE Transactions on Information Theory* 53 (2007). 4: 1521-1532.

Sejdinovic, Dino, Vukobratovic, Dejan, Doufexi, Angela, Senk, Vojin, and Piechocki, Robert J. "Expanding window fountain codes for unequal error protection." *IEEE Transactions on Communications* 57 (2009). 9: 2510-2516.

Shokrollahi, Amin. "Raptor codes." *IEEE Transactions on Information Theory* 52 (2006). 6: 2551-2567.

Sun, Kairan, Zhang, Huazi, and Wu, Dapeng. "Delay-aware Fountain Codes for Video Streaming with Optimal Sampling Strategy." *in preparation* (2016).

U.S. Naval Research Laboratory, Networks and Communication Systems Branch. "The extendable mobile ad-hoc network emulator (EMANE)." 2014.

Vukobratovic, Dejan, Stankovic, Vladimir, Sejdinovic, Dino, Stankovic, Lina, and Xiong, Zixiang. "Scalable video multicast using expanding window fountain codes." *IEEE Transactions on Multimedia* 11 (2009). 6: 1094-1104.

Wagner, Jean-Paul, Chakareski, Jacob, and Frossard, Pascal. "Streaming of scalable video from multiple servers using rateless codes." *IEEE International Conference on Multimedia and Expo,* 2006. IEEE, 2006, 1501-1504.

What is claimed is:

1. A relay node configured to:
receive original packets originated from a plurality of terminal nodes;
recode the original packets to recoded packets, wherein the recoding of the original packets comprises linearly recombining the original packets originating from the plurality of terminal nodes;
broadcast the recoded packets, wherein each of the plurality of terminal nodes (1) receives the recoded packets broadcasted by the relay node and (2) recovers the original packets based at least in part on the recoded packets; and
responsive to receiving an acknowledgement from each of the plurality of terminal nodes indicating that the corresponding terminal node has enough degree of freedom to decode the recoded packets, stop broadcasting the recoded packets.

2. The relay node according to claim 1, wherein each of the plurality of terminal nodes recovers the original packets by solving linear equations.

3. The relay node according to claim 2, wherein parameters of the linear equations are randomly chosen integers and are linearly independent.

4. The relay node according to claim 2, wherein inter-session linear network coding (RLNC) is applied to maximize MIMO throughput.

5. The relay node according to claim 2, wherein each of the plurality of terminal nodes comprises both a transmitter and a receiver.

6. The relay node according to claim 5, wherein two or more of the plurality of terminal nodes cannot communicate directly.

7. The relay node according to claim 2, wherein each node overhears and stores packets sent by neighboring nodes.

8. The relay node according to claim 2, wherein each terminal node receives all packets sent by other terminal nodes through the relay node.

9. The relay node according to claim 2, wherein the relay node, the terminal nodes, or both compute the rank of stored packets.

10. A method of data transmission in wireless networks, the method comprising:
receiving and storing original packets by one or more relay nodes, wherein the original packets are originated from a plurality of terminal nodes;
recoding the original packets to recoded packets by the one or more relay nodes, wherein the recoding of the original packets comprises linearly recombining the original packets originated from the plurality of terminal nodes;
broadcasting the recoded packets by the one or more relay nodes, wherein each of the plurality of terminal nodes (1) receives the recoded packets broadcasted by the one or more relay nodes and (2) recovers the original packets based at least in part on the recoded packets; and
responsive to receiving an acknowledgement from each of the plurality of terminal nodes indicating that the corresponding terminal node has enough degree of freedom to decode the recoded packets, stopping broadcasting the recoded packets by the one or more relay nodes.

11. The method according to claim 10, further comprising recovering the original packets by solving linear equations in each of the plurality of terminal nodes.

12. The method according to claim 10, wherein the one or more relay nodes comprise a plurality of edge routers, wherein each of the plurality of edge routers is directly connected to one or more of the plurality of terminal nodes, and a backbone router connected to the plurality of edge routers.

13. The method according to claim 12, wherein the plurality of edge routers mix the received original packets and forward the mixed packets to the backbone router.

14. The method according to claim 13, wherein the backbone router overhears packets broadcasted by the plurality of edge routers.

15. The method according to claim 10, wherein the one or more relay nodes randomly combine only data within the received original packets and keep coding coefficients untouched.

16. The method according to claim 15, wherein the one or more relay nodes partially decode.

17. The method according to claim 10, wherein each of the plurality of terminal nodes buffers all coefficients of linearly independent packets.

18. The method according to claim 17, wherein each of the one or more relay nodes keeps a track of routing information and the buffered all coefficients of each of the plurality of terminal nodes.

* * * * *